(12) United States Patent
Davies

(10) Patent No.: US 6,176,370 B1
(45) Date of Patent: Jan. 23, 2001

(54) ENDLESS CONVEYOR HAVING QUICK RELEASE SLATS

(75) Inventor: John M. Davies, Willington, CT (US)

(73) Assignee: Gerber Technology, Inc., Tolland, CT (US)

(*) Notice: Under 35 U.S.C. 154(b), the term of this patent shall be extended for 0 days.

(21) Appl. No.: 09/375,832

(22) Filed: Aug. 16, 1999

(51) Int. Cl.$^7$ .................................................. B65G 29/00
(52) U.S. Cl. ............................... 198/867.15; 198/803.2; 198/867.01
(58) Field of Search .................... 198/803.2, 867.1, 198/867.14, 867.15, 817, 465.1

(56) References Cited

U.S. PATENT DOCUMENTS

| | | | |
|---|---|---|---|
| 4,078,654 | * | 3/1978 | Sarovich ..................... 198/867.15 X |
| 4,167,999 | * | 9/1979 | Haggerty ...................... 198/803.2 X |
| 4,362,077 | | 12/1982 | Gerber . |
| 4,646,911 | | 3/1987 | Pearl et al. . |
| 4,672,172 | | 6/1987 | Pearl . |
| 4,730,526 | | 3/1988 | Pearl et al. . |
| 4,778,045 | * | 10/1988 | Grune et al. ................ 198/867.14 X |
| 5,042,338 | | 8/1991 | Gerber . |
| 5,189,936 | | 3/1993 | Gerber et al. . |
| 5,207,140 | | 5/1993 | Rosen . |
| 5,228,554 | | 7/1993 | Kuchta et al. . |
| 5,241,733 | | 9/1993 | Rosen . |
| 5,596,917 | | 1/1997 | Gerber et al. . |
| 5,967,221 | * | 10/1999 | Persson ....................... 198/867.15 X |
| 5,988,364 | * | 11/1999 | Boyle et al. .................... 198/867.15 |

* cited by examiner

Primary Examiner—James R. Bidwell
(74) Attorney, Agent, or Firm—McCormick, Paulding & Huber LLP

(57) ABSTRACT

In an endless conveyor, a plurality of slats are positioned in a side-by-side relationship relative to one another, thereby defining a work supporting surface which in turn is carried by a frame. The slats are driven via at least one chain that includes a plurality of pins extending therefrom, each adapted to engage a bracket mounted to one of the slats. The chain is moved in response to commands issued from a controller, thereby causing the slats to move relative to the frame.

5 Claims, 4 Drawing Sheets

ENDLESS CONVEYOR HAVING QUICK RELEASE SLATS

FIELD OF THE INVENTION

The present invention is generally directed to devices having conveyorized work supporting surfaces and more specifically resides in an endless conveyor defined by a plurality of slats positioned in a side-by-side relationship relative to one another, each of said slats being easily removable from the conveyor.

BACKGROUND OF THE INVENTION

The present invention has utility in several different applications wherein a conveyor is used to move material from one place to another. One area where the present invention finds particular utility is in the area of garment production wherein conveyorized cutting tables are employed to cut pattern pieces from stacks of fabric layers referred to as a lay. Accordingly, the present invention will be described as being applied to such use; however, this should not be construed in a limiting sense.

In the mass production of garments, pattern pieces used to fabricate a finished item of clothing are typically cut from multiple layers in a single operation. Generally, this is accomplished by supporting the layers of fabric on a work support surface that is conveyorized. During operation, a vacuum is typically drawn from below the work supporting surface to hold the layers of fabric in place. A cutting head having a reciprocating knife mounted thereon moves along the cutting table, generating the individual pattern pieces by cutting through the layers of fabric in response to commands issued from a controller. When a cutting operation is complete, the layers of fabric with the pattern pieces cut therefrom are advanced off of the cutting table by the conveyorized work supporting surface.

Historically, the conveyorized work supporting surfaces on cutting tables have been configured as shown in FIG. 1 with of a plurality of individual slats positioned in a side-by-side relationship relative to one another. Each individual slat was bolted to a bracket that in turn was bolted to a conveyor drive chain. As the chain moved relative to the cutting table, the individual slats also moved with it. In addition to being mounted on the conveyor drive chain, each slat also had a plurality of bristle blocks mounted thereon and in side-by-side relationship extending longitudinally along the entire length of the slat. A problem which sometimes occurs in devices configured in this manner is that it may be necessary to remove one or more slats from the conveyor to perform maintenance operations on the cutting table. This is quite difficult when the above-described design is employed, as the slats are quite narrow and insufficient space is provided to comfortably access the bolts holding the slats to the chain. In addition, with the other slats in place, it is difficult for a maintenance worker to reach the bolts retaining the slats to the drive chain as the area he/she must work in is quite narrow, initially only equal to the width of a single slat. This problem results in increased down time for the cutting table, thereby reducing production and increasing the cost of the finished product.

Based on the foregoing, it is a general object of the present invention to overcome the problems and drawbacks associated with prior art conveyorized work supporting surfaces.

It is a more specific object of the present invention to provide a conveyorized work supporting surface comprised of a plurality of individual slats wherein each slat can be easily and quickly removed therefrom.

SUMMARY OF THE INVENTION

The present invention is directed to an endless conveyor including a frame having a work supporting surface carried thereon. The work supporting surface is comprised of a plurality of slats, each defining a pair of opposed longitudinal edges extending across the frame and positioned in a side-by-side relationship relative to each other, thereby defining the work supporting surface. Drive means are provided for advancing the plurality of slats along the frame in response to commands issued from a controller that selectively generates and sends control signals to the conveyor. Mounting means are employed to slidably and releasably couple each of the slats to the drive means such that the longitudinal edge of one slat is positioned adjacent and approximately parallel to a longitudinal edge defined by the next successive slat. During operation, the drive means cause the work supporting surface to move relative to the frame along the length thereof. To ensure proper alignment of the slats relative to the frame, guide means are also included for releasably retaining each of the slats on the drive means for directing the movement of each slat relative to the frame during operation of the conveyor.

In the preferred embodiment of the present invention, at least one drive bracket is mounted to an end of each of the slats on an underside thereof. In addition, the drive means includes at least one pair of sprockets rotatably mounted to the frame in spaced apart relation relative to one another with at least one of the sprockets being driven in response to the commands issued from the controller. A chain extends between and is drivingly engaged with the pair of sprockets with the mounting means including a plurality of extensions projecting outwardly from the chain, each being adapted to slidably engage one of the brackets mounted to a slat, thereby causing the slat to move in response to movement of the chain. Preferably, the plurality of extensions are in the form of shaped pins with each of the brackets defining at least one aperture having a shape complimentary to and adapted to receive at least one of the pins.

Preferably, the frame defines a pair of opposed side walls approximately perpendicular to the slats and parallel to each other. The guide means includes at least one end cap releasably coupled to an end of each of the slats and slidingly engaged with one of the side walls. Each cap defines a projection extending therefrom and adapted to engage an aperture in the end of said slat, thereby causing the cap to be snap fit onto the slat and be easily removable therefrom.

DETAILED DESCRIPTION OF THE PREFERRED EMBODIMENT

Figure 1:
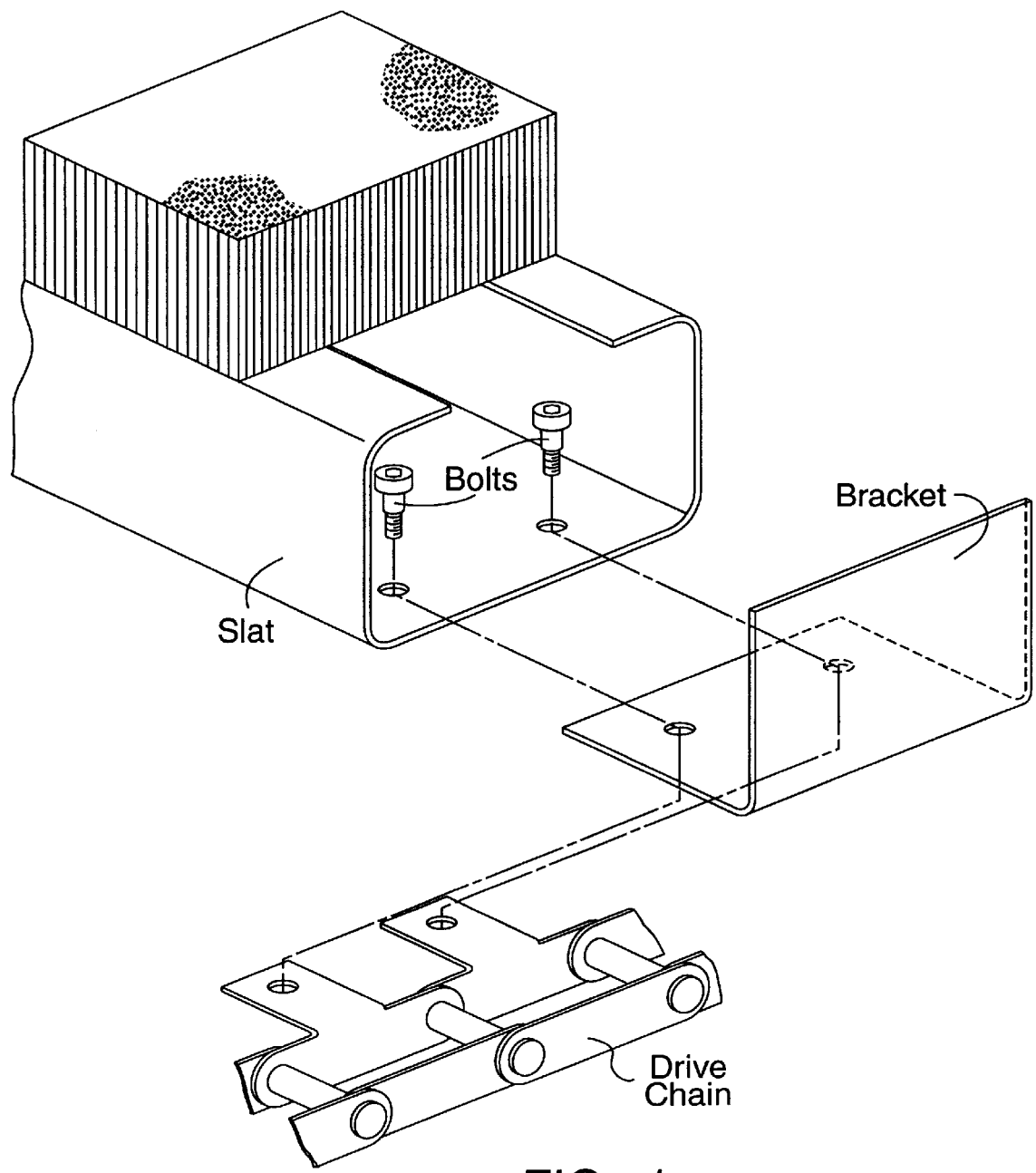
FIG. 1 is a partial exploded view of a prior art slat mounting assembly.
Figure 2:
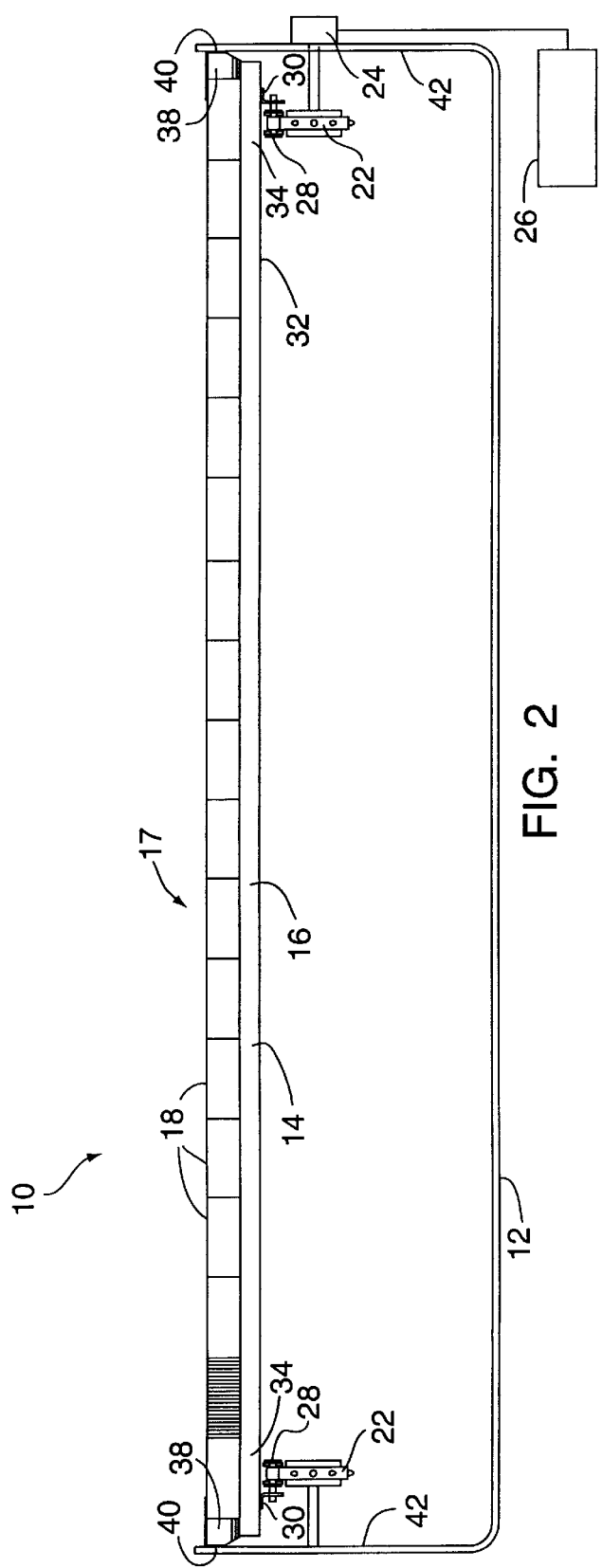
FIG. 2 is a partial cross sectional front view of a conveyorized work supporting surface in accordance with the present invention.

As shown in FIG. 2, a section of an endless conveyor generally designated by the reference number 10 includes a frame 12 having a plurality of slats 14 carried thereon, each defining a pair of longitudinal edges 16 (one shown) extending across the frame. Each slat 14, 14 is positioned in a side-by-side relationship relative to the next successive slat, thereby defining a work supporting surface generally designated by the reference number 17. A plurality of bristle blocks 18 are coupled to each slat and extend longitudinally therealong. Each bristle block includes a series of finger-like projections extending upwardly relative to the slat to allow a cutter such as a knife (not shown) to pass through the projections while still being able to maintain the integrity of the work supporting surface. The slats are driven by suitable means explained hereinbelow such that each slat moves relative to the frame 12.

Figure 3:
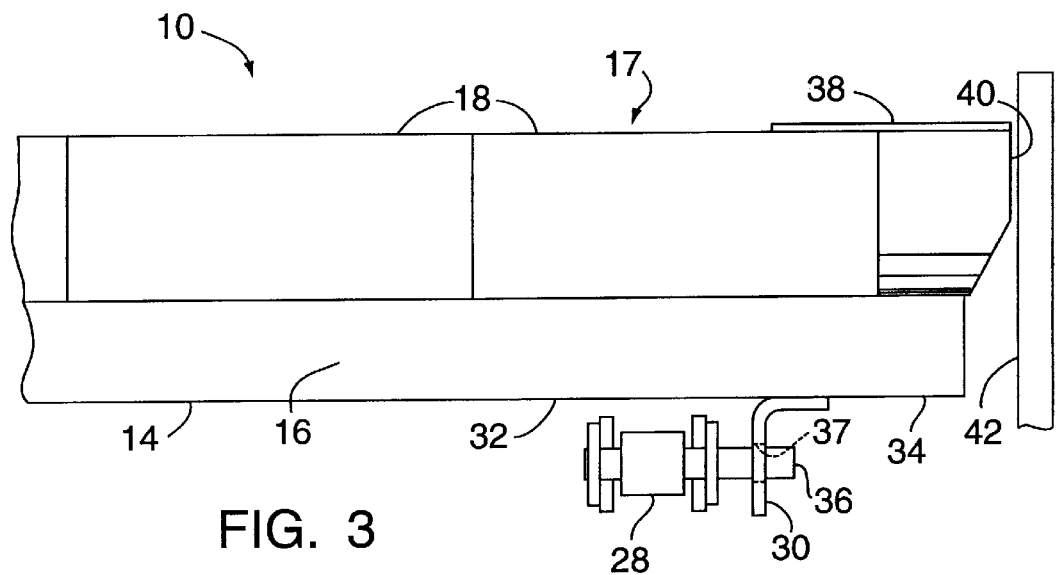
FIG. 3 is an enlarged view of the apparatus of FIG. 2.

Referring to FIGS. 2 and 3, two pairs of sprockets 22 (one shown for each pair) are rotatably mounted to the frame in spaced relationship relative to one another and at least one of said sprockets is driven by a suitable means such as but not limited to a motor 24 in response to commands issued by a controller 26. A pair of chains 28 are also provided with one chain being drivingly engaged with each pair of sprockets 22. A pair of drive brackets 30 are attached to an underside 32 defined by each slat 14, each bracket being positioned adjacent to an end 34 of the slat. Each drive chain 28 includes a plurality of extensions 36 shown in the illustrated embodiment in the form of a generally cylindrical pin, projecting outwardly from the chain. Each of these extensions 36 is adapted to slidably engage an aperture 37 of a shape complementary to the shape of the extension, thereby drivingly mounting each slat to each of the drive chains 28. Referring to FIG. 2, the extensions 36 are positioned such that the slat, as will be explained in detail hereinbelow, can be moved in the direction indicated by the arrow labeled "S" to a point where the extensions are not engaged with the drive brackets 30, thereby allowing individual slats to be removed from the conveyor 10.

Figure 4:
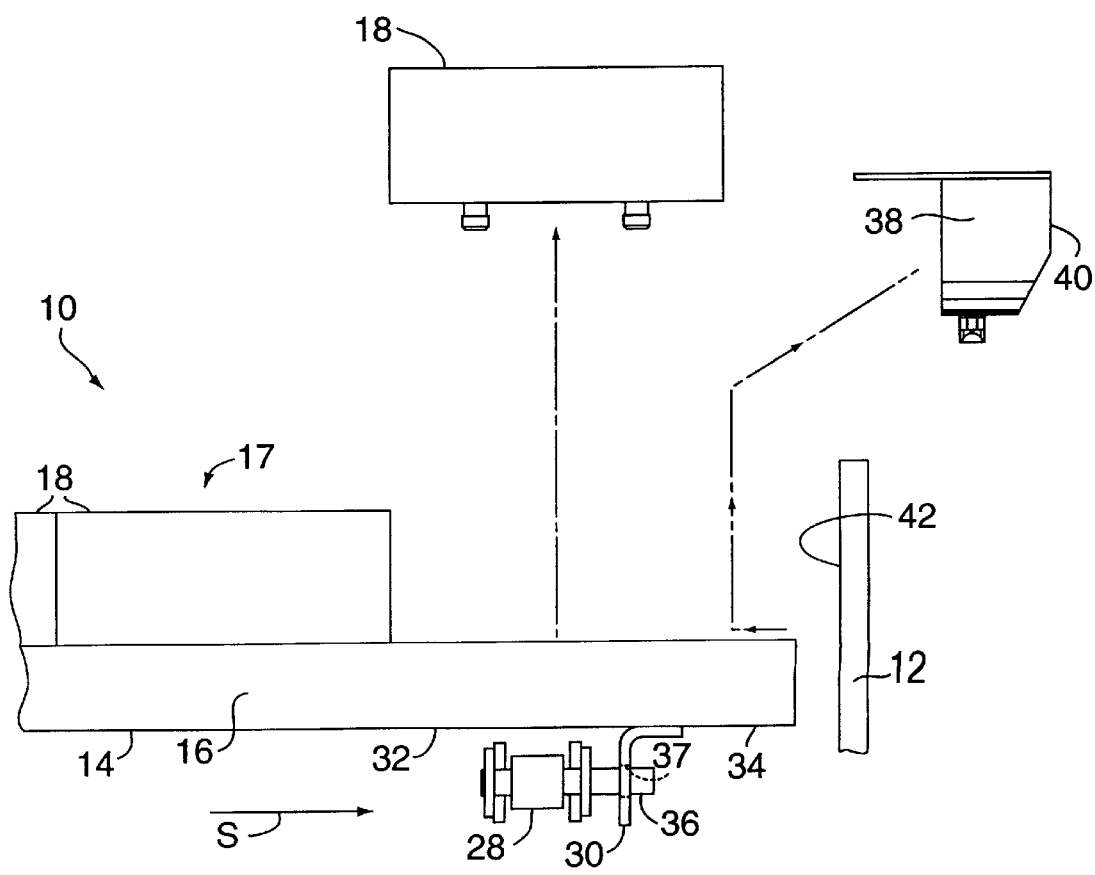
FIG. 4 is a partial exploded view of the slat assembly of FIG. 2.

Referring to FIGS. 2 and 4, a pair of end caps 38 are mounted to each slat 14, one adjacent to each end 34 thereof. Each end cap defines an outwardly facing surface 40 adapted to slidingly engage a side wall 42 of the frame 12, the side walls being approximately parallel to one another. In this manner, the surface 40 acts to guide the slat 14 as it is moved via chains 28, relative to the frame.

Figure 5:
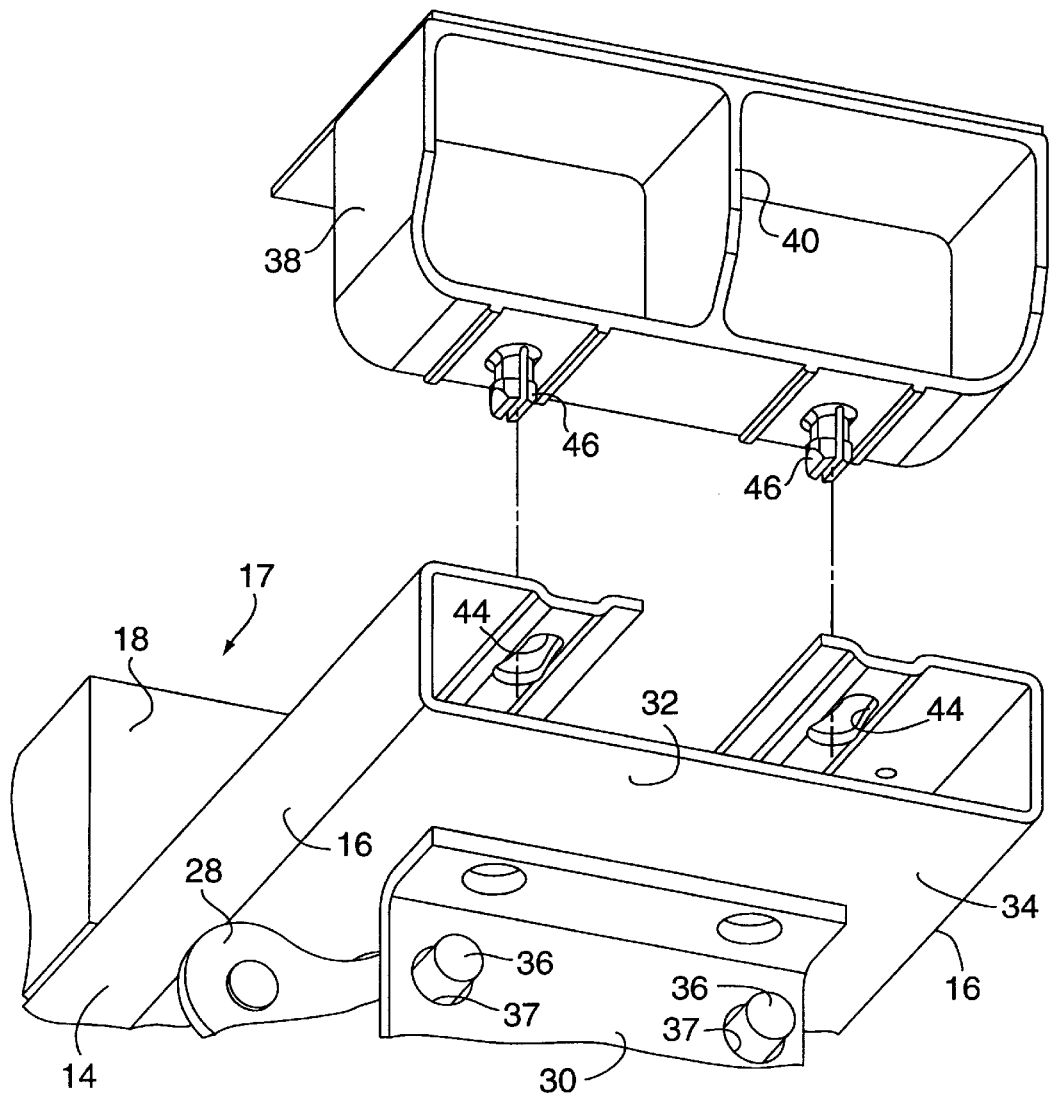
FIG. 5 is an enlarged partial exploded view showing the enlarged mounting arrangement of the present invention.

Turning to FIGS. 4 and 5, each slat 14 also defines a pair of spaced apart slots 44 at each end 34, the slots being adapted to receive a pair of downwardly depending protrusions 46 extending from each end cap 38. Accordingly, the end caps 38 can be mounted in situ, to the slats as shown in FIG. 4 by first removing the bristle block 18 adjacent to the end cap 38 and positioning the protrusions 46 into the slots 44. The end cap 38 can then be slid towards the frame side wall 42 in the direction 5. Upon installation of the end cap, the bristle block can be replaced.

During operation, should it become necessary to remove one of the slats 14, this is accomplished by first removing the bristle block 18 adjacent to the end cap 38 and then sliding the end cap inwardly toward the bristle blocks and removing it from the slat. The slat 14 can then be slid off of the pin 36 in the direction 5 and removed from the conveyor 10. It is preferable that the protrusions 46 extending from the end cap 38 snap into the slots 44 to provide stable operation of the conveyor.

It is to be understood that the form of the invention shown and described herein is to be taken as a preferred embodiment of the same, and that various changes in the selection of parts comprising the broadly defined means and in the arrangement of said parts may be resorted to without departing from the spirit of the invention or the scope of the following claims.

What is claimed is:

1. An endless conveyor comprising:

a frame;

a controller for selectively generating and sending control signals to said conveyor;

a plurality of slats carried by said frame each defining a pair of opposed longitudinal edges, extending across said frame and positioned in a side-by-side relationship relative to each other, and defining work supporting surface;

drive means for advancing said plurality of slats along said frame in response to commands issued from said controller;

mounting means for releasably and slidably coupling each of said slats to said drive means, such that the longitudinal edge of one slat is positioned adjacent and approximately parallel to a longitudinal edge defined by the next successive slat; and guide means for releasably retaining each of said slats on said drive means and for directing the movement of each slat relative to said frame during operation of said conveyor.

2. An endless conveyor as defined by claim 1, further comprising:

at least one drive bracket mounted to an end of each of said slats on an underside thereof; and wherein said drive means includes at least one pair of sprockets rotatably mounted to said frame in spaced-apart relation relative to one another, at least one of said sprockets being driven in response to said commands issued from said controller;

at least one chain extending between and drivingly engaged with said pair of sprockets; and said mounting means includes a plurality of extensions projecting outwardly from said chain, each extension being adapted to slidably engage one of said brackets causing said slat to move in response to movement of said chain.

3. An endless conveyor as defined by claim 2, wherein:

said plurality of extensions includes a plurality of shaped pins; and each of said brackets defines at least one aperture of a shape complimentary to, and adapted to receive one of said pins.

4. An endless conveyer as defined by claim 1, wherein:

said frame defines a pair of opposed side walls approximately perpendicular to said slats, and parallel to each other; and said guide means includes at least one end cap releasably coupled to an end of each of said slats and slidingly engaged with one of said side walls.

5. An endless conveyer as defined by claim 4 wherein:

each of said slats defines at least one aperture located adjacent to said end of slat; and wherein each of said end caps defines a projection extending therefrom and adapted to engage said aperture in said slat, thereby releasably retaining said end cap thereon.

* * * * *

UNITED STATES PATENT AND TRADEMARK OFFICE
CERTIFICATE OF CORRECTION

PATENT NO. : 6,176,370
DATED : January 23, 2001
INVENTOR(S) : John M. Davies

It is certified that error appears in the above-identified patent and that said Letters Patent is hereby corrected as shown below:

Column 3, Line 51: After "direction", delete "5" and substitute --S--.
Column 3, Line 58: After "direction", delete "5" and substitute --S--.

Signed and Sealed this

Twenty-ninth Day of May, 2001

Attest:

NICHOLAS P. GODICI

*Attesting Officer*       Acting Director of the United States Patent and Trademark Office